United States Patent [19]
Adachi et al.

[11] Patent Number: 5,186,242
[45] Date of Patent: Feb. 16, 1993

[54] CONDENSER PROVIDED WITH FORCED COOLING MEANS

[75] Inventors: Tsunenari Adachi; Hitoshi Akasaka; Yutaka Moriyama, all of Tokyo, Japan

[73] Assignee: Calsonic Corporation, Tokyo, Japan

[21] Appl. No.: 664,875

[22] Filed: Mar. 5, 1991

[30] Foreign Application Priority Data

Mar. 9, 1990 [JP] Japan .................. 2-23193[U]
Mar. 28, 1990 [JP] Japan .................. 2-76588

[51] Int. Cl.$^5$ .................. F25B 19/00; F28B 5/00
[52] U.S. Cl. .................. 165/110; 165/104.27; 165/140; 62/268; 62/169; 62/244; 62/507
[58] Field of Search .................. 165/110, 140, 104.27; 62/268, 169, 244, 507

[56] References Cited

U.S. PATENT DOCUMENTS

| | | | |
|---|---|---|---|
| 2,099,567 | 11/1937 | MacLean | 63/268 |
| 2,157,409 | 5/1939 | Helfrecht | 62/169 |
| 2,512,056 | 6/1950 | Droescher | 62/169 |
| 2,820,351 | 1/1958 | Dolza et al. | 62/268 |
| 4,676,071 | 6/1987 | Latimer | 62/506 |
| 4,870,828 | 10/1989 | Hidaba | 62/268 |

FOREIGN PATENT DOCUMENTS

58546 12/1982 Japan .................. 165/110

Primary Examiner—Albert W. Davis, Jr.
Attorney, Agent, or Firm—Gordon W. Hueschen

[57] ABSTRACT

A condenser is disclosed which is provided with a forced cooling system adapted to effect forced cooling of a gaseous coolant in the condenser by exchange of heat with water. This forced cooling system comprises an evaporation chamber disposed in a coolant inlet side flow path of the condenser and provided therein with fins, a vacuum tank (or a water pump) for circulating water in a closed flow path passed through the evaporation chamber, an orifice for decompressing the water being introducing into the evaporation chamber, and a control device for effecting circulation of water only when necessity arises. The water is aspirated, when necessary, by negative pressure from a water storage tank, decompressed to a prescribed saturated pressure by the use of the orifice and consequently atomized and allowed to flow into the evaporation chamber, and allowed to deprive the gaseous coolant at high temperature of a large amount of the latent heat of vaporization and consequently cool the gaseous coolant. As a result, the operating ability of condenser is notably improved.

13 Claims, 8 Drawing Sheets

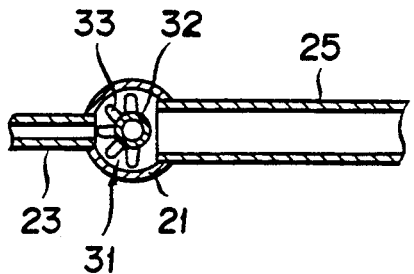
FIG. 8(A)
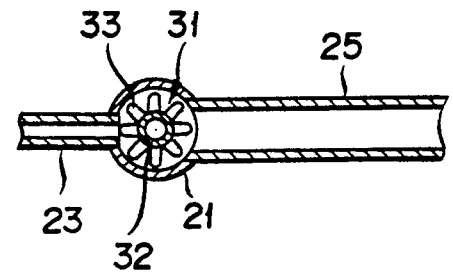
FIG. 8(B)
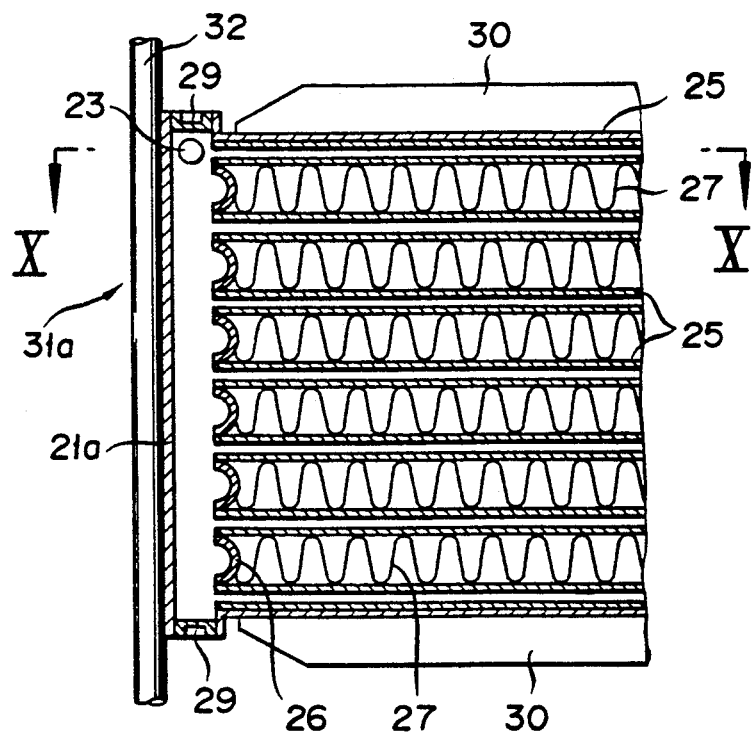
FIG. 9
FIG. 10

CONDENSER PROVIDED WITH FORCED COOLING MEANS

BACKGROUND OF THE INVENTION

1. Field of the Invention

This invention relates to a condenser provided with forced cooling means and more particularly to a condenser provided with forced cooling means capable of enhancing the operational ability of a condenser incorporated in an air conditioner for an automobile without entailing a dimensional increase of the condenser.

2. Description of the Prior Art

Generally, while an automobile is in a parked state, the temperature inside its coach is elevated to a fairly high level by the radiant heat. At the time that the automobile is started, therefore, the internal temperature of the coach is desired to be quickly lowered (hereinafter referred to as "cooling-down") by setting an air conditioner in the automobile into operation. During the process of this cooling-down, the air conditioner is operating at its maximum capacity. When this cooling-down is quick, the thermal load resulting from the accumulation of radiant heat is quickly decreased, the internal heat of the coach is quickly returned to the basic level of thermal load, and the air conditioner is consequently allowed not only to manifest its stable cooling ability but also relieve itself of the noise attendant on the full-speed operation of a fan during the cooling-down. From this point of view, the desirability of improving the maximum cooling ability of an automobile air conditioner for the enhancement of the cooling-down ability has been finding enthusiastic recognition recently.

For the improvement of the maximum cooling ability of an air conditioner, an idea of enlarging various component devices of a refrigeration cycle in the air conditioner as by increasing heat-transfer areas of heat exchangers such as condensers and giving an increased capacity to a compressor, for example, may be conceived. This enlargement of various devices, however, not only has its limit by reason of space but also entails an increase in the amount of a coolant and an addition to the weight of the automobile and a decrease in fuel economy. These outcomes of the enlargement are directly contrary to the current worldwide trend of automobiles toward decreasing component devices in volume and weight and improving fuel economy.

As respects condensers, for example, among the condensers invented to date for use in automobile air conditioners are those of the serpentine type having a flat profile tube provided therein with a plurality of flow paths and bent serpentinely and, therefore, allowing a coolant to flow along the profile tube and those of the type having a multiplicity of flat tubes laid to intercommunicate a pair of parallelly disposed header tanks and consequently giving rise to a multiplicity of parallel flows of a coolant (hereinafter referred to as "multi-flow type"). The condensers of the multi-flow type, as compared with those of the serpentine type, have the advantages of allowing a decrease in the wall thickness of tube, offering a small resistance to the flow of a coolant, and generally exhibiting a high heat-exchange ability. They nevertheless suffer from the disadvantage of the header tanks and their vicinities permitting virtually no flow of cooling air, producing virtually no heat-exchange action, and making no contribution to the ability of the condenser and proving only wasteful. Particularly when the header tank on the coolant inlet side which is destined to introduce the coolant in a heated state fails to perform exchange of heat efficiently within itself and in its vicinity, the condensers are inevitably required to secure their prescribed condensing ability by elongating the flat tubes serving as parts for exchanging heat with air or increasing the number of such flat tubes and consequently opening up the possibility of enlarging the relevant devices. Thus, in the condensers which rely solely on air cooling, it is extremely difficult to improve the condensing ability without enlarging the relevant devices.

A technique of improving the ability of a condenser while avoiding enlargement of devices has been materialized, for example, by a process which comprises spraying atomized water onto the surface of the condenser and consequently allowing the atomized water impinging on the surface to be vaporized by the heat of the condenser. Indeed the supplemental incorporation in a condenser of the system of vaporizing water and, at the same time, liquefying a gaseous coolant may be effective in improving not merely a condenser of the multi-flow type but also a condenser of the serpentine type, the technique under discussion which resides exclusively in spraying atomized water onto the surface of a condenser has the possibility that the exchange of heat between the water and the gaseous coolant inside the condenser will not proceed sufficiently in proportion to the amount of the water to be sprayed. Moreover, since the system is not in a hermetically closed state, the pressure thereof cannot be adjusted relative to the water and the utilization of the latent heat resulting from the vaporization of water has its limit. This technique, therefore, cannot be expected to effect a very conspicuous improvement in the ability of the condenser because the efficiency with which the heat is exchanged between the water and the gaseous coolant never deserves to be held in high esteem. Further, since the water is sprayed in an atomized state onto the surface of the condenser, there is the possibility of the water corroding the condenser.

For the purpose of avoiding these problems, therefore, techniques of water-cooling the gaseous coolant have been invented as disclosed in Japanese Utility Model Publication SHO 57(1982)-58,546 and U.S. Pat. No. 4,676,071.

SUMMARY OF THE INVENTION

An object of this invention is to provide a condenser provided with forced cooling means which effects highly efficient exchange of heat with a device of simple construction and permits an improvement in the ability of condensation without entailing any addition to the relevant devices in volume and weight.

The present invention accomplishes this object by a condenser provided with forced cooling means, which comprises a condenser for air-cooling a gaseous coolant of high temperature and high pressure into a liquefied coolant, cooling means disposed in the coolant inlet side flow path of the condenser, provided with a heat-radiating member, and adapted to effect forced cooling of the gaseous coolant by exchange of heat with a liquid, circulating means for circulating the aforementioned liquid through a closed circulation path passed through the cooling means, decompressing means disposed in the inlet side flow path guiding the liquid to the cooling means and adapted to decompress the liquid, and controlling means for opening the flow path for the liquid only when necessity arises. As a result, the liquid mentioned above is decompressed to a prescribed saturated pressure, allowed to flow into the cooling means, and efficiently vaporized by concentrically depriving the hot gaseous coolant flowing into the condenser of a large volume of the latent heat resulting from the vaporization. In the meantime, therefore, the gaseous coolant is enabled to be quickly cooled. As a result, the operational ability of the condenser is notably improved.

BRIEF DESCRIPTION OF THE DRAWINGS

FIG. 8A-B is a cross section illustrating the essential part of the condenser having fins disposed on the periphery of a water-cooling tube, as taken through FIG. 7 along the line VIII—VIII.

FIG. 9 is a cross section illustrating the essential part of a condenser as yet another embodiment of this invention.

FIG. 10 is a cross section illustrating the essential part of the condenser, taken through FIG. 9 along the line X—X.

DETAILED DESCRIPTION OF THE INVENTION

Now, this invention will be described in detail below with reference to the illustrated embodiments of this invention.

Figure 1:
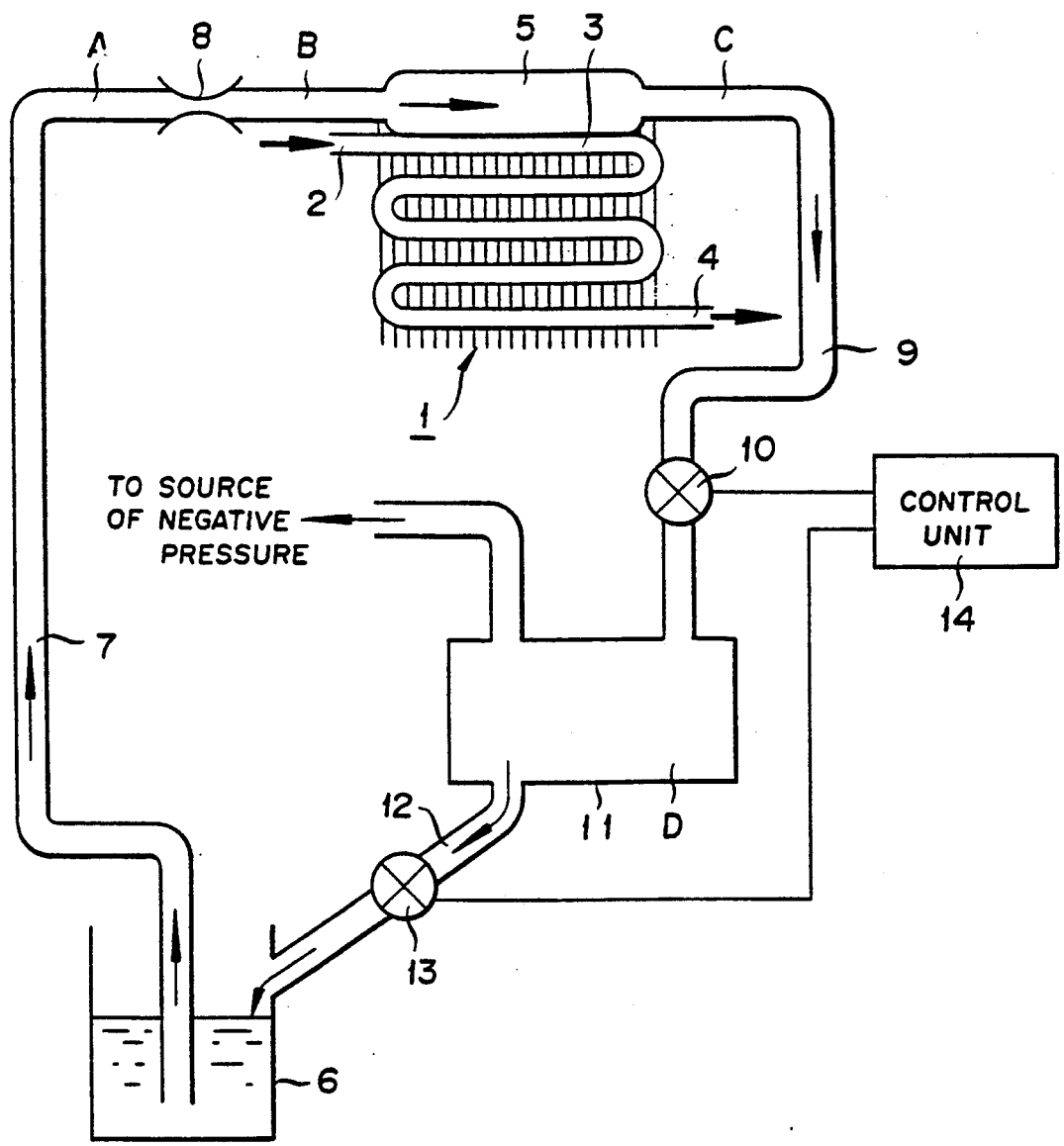
FIG. 1 is a schematic structural diagram of a condenser provided with forced cooling means, as one embodiment of this invention for accomplishing the object described above.

FIG. 1 is a schematic structural diagram of a condenser provided with forced cooling means, as one embodiment of this invention. A condenser 1 constitutes itself one component of a refrigeration cycle for an automobile air conditioner and incorporates therein a forced cooling system for cooling the gaseous coolant inside the condenser 1 by virtue of the latent heat resulting from the vaporization of a liquid such as water. In the diagram, a condenser of the serpentine type is illustrated as the condenser 1.

Generally, the refrigeration cycle of the automobile air conditioner is formed by interconnecting the condenser 1 with unshown expansion valve, evaporator, and compressor with a piping and sealing a coolant therein. In the process in which the coolant is repeatedly circulated as subjected to changes of the state of aggregates through the refrigeration cycle, the coolant in the evaporator cools the air blown into the coach by depriving the air of its heat and in the condenser 1 releases into the ambient air the heat collected in the evaporator. The cooling capacity or ability of the air conditioner (reported in Kcal/h) represents the heat quantity which the coolant can collect from the air in the evaporator. One method available for enhancing the cooling ability of the air conditioner comprises amplifying the condensing ability of the condenser 1 (reported in Kcal/h), namely the heat quantity collected in the evaporator and the heat quantity spent in the compressor for condensing the gaseous coolant which can be jointly released by the coolant in the condenser. The heat-radiating action of the coolant in the condenser 1 is generally effected by the exchange of heat between the coolant and the air (air-cooling type). In consequence of this heat-radiating action, the hot gaseous coolant which has flowed through a coolant inlet tube 2 into the condenser 1 is liquefied and allowed to flow out of a coolant output tube 4 in the form of a liquid coolant.

The notable improvement attained in the condensing ability of the condenser 1 by this invention is realized by causing the condenser 1 to incorporate therein a forced cooling system illustrated in FIG. 1 which is adapted in accordance with this invention to utilize the latent heat resulting from the vaporization of water.

First, the construction of this forced cooling system will be described.

In this forced cooling system, as illustrated in FIG. 1, an evaporation chamber 5 which, as cooling means, vaporizes water owing to exchange of heat with the gaseous coolant is set in place in the coolant inlet side flow path 3 of the condenser 1, namely the part of the condenser 1 interior at which the gaseous coolant has the highest temperature, as held in contact with the coolant inlet side flow path 3. To one end of the evaporation chamber 5, a water storage tank 6 for storing the water for supply to the evaporation chamber 5 is connected through the medium of an inlet tube 7. To the other end of the evaporation chamber 5, a vacuum tank 11, i.e. a negative pressure device for supplying the negative pressure capable of inducing the flow of the water from within the water storage tank 6 to the interior of the evaporation chamber 5, is connected as circulating means via an outlet tube 9. The water storage tank 6 is adapted to store water (liquid) in an amount sufficient for enabling the forced cooling system to fulfill its function and the vacuum tank 11 to store a fixed amount of the negative pressure to be generated by a negative pressure source such as, for example, an engine manifold. Further, the water storage tank 6 and the vacuum tank 11 are interconnected through the medium of a drainpipe 12. The water in the water storage tank 6, therefore, is circulated along a closed path of inlet tube 7—evaporation chamber 5 —outlet tube 9—vacuum tank 11—drainpipe 12—water storage tank 6 inside the closed loop.

On the evaporation chamber 5 inlet side of the inlet tube 7, an orifice or decompressing means for decompressing the water introduced by suction into the evaporation chamber 5 thereby facilitating the vaporization of this water is disposed. The diameter of this orifice 8 is set at a magnitude fit for acquisition of a desired decompression. The outlet tube 9 is provided with a vacuum supply valve 10, i.e. an open-close means for turning on and off the supply of the negative pressure from the vacuum tank 11. This vacuum supply valve 10 additionally functions as a control value for opening and closing the flow path extending from the water storage tank 6 via the evaporation chamber 5 to the vacuum tank 11. In the present embodiment, the vacuum supply valve 10 is a spring return type solenoid valve which is normally kept closed by the resilient force. Owing to the provision of the vacuum supply valve 10, it is made possible for the water to flow into the evaporation chamber 5 only during the maximum cooling period (cooling-down period) which requires the maximum cooling force.

The drainpipe 12 is provided with a drain valve 13 for discharge of water for the purpose of enabling the vacuum tank 11 to fulfill the function of liquefying the steam resulting from the vaporization of water in the evaporation chamber 5 and collecting the resultant steam condensate. In the present embodiment, the drain valve 13 is a spring return type solenoid valve and is normally kept closed by the resilient force.

The vacuum supply valve 10 and the drain valve 13 are severally connected to a control unit or device 14 as control means. These valves 10, 13 are opened and closed by signals from the control device 14.

Figure 2:
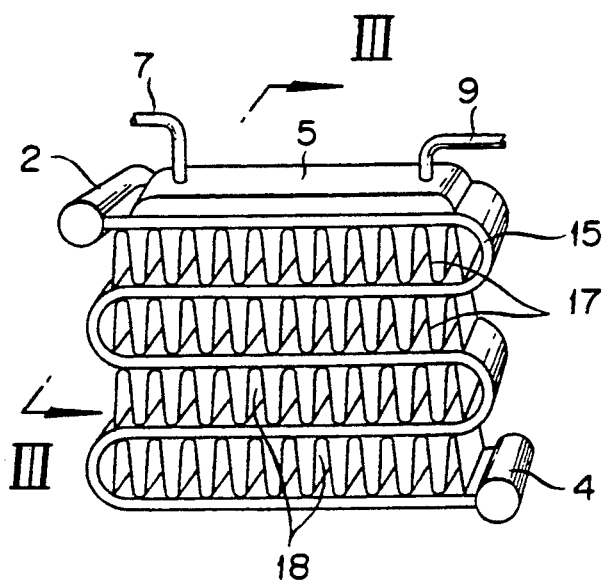
FIG. 2 is a perspective view of a condenser of the serpentine type shown in FIG. 1.
Figure 3:
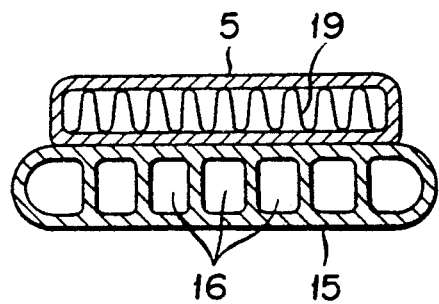
FIG. 3 is a cross section of a flat tube of a condenser, taken through FIG. 2 along the line III—III.

FIG. 2 and FIG. 3 illustrate examples of the forced cooling system applied to the condenser 1 of the serpentine type.

The expression "condenser 1 of the serpentine type" refers to what is produced by draw molding a profile tube 15 of a flat elliptical cross section having a plurality of flow paths 16 formed therein, bending serpentinely the profile tube 15 thereby interposing air flow paths 18 studded with fins 17 in the resultant intervening spaces, and connecting the coolant inlet tube 2 and the coolant outlet tube 4 to the opposite terminals of the profile tube 15, so that the coolant flows along the profile tube 15. In the present embodiment, the evaporation chamber 5 for vaporizing water by the exchange of heat between the water and the gaseous coolant is disposed on the coolant inlet side of the profile tube 15, namely the coolant inlet side flow path 3 of the condenser 1, as held in contact with the profile tube 15. Desirably, for the purpose of improving the efficiency of exchange of heat between the evaporation chamber 5 and the profile tube 15, the evaporation chamber 5 is provided therein with fins 19 which are heat-radiating members.

Now, the operation of the condenser provided with the forced cooling system constructed as described above will be explained below.

The vacuum supply valve 10 and the drain valve 13 are severally kept closed unless during the cooling-down period requiring the maximum cooling force. The vacuum tank 11, therefore, is in the state of storing a stated amount of negative pressure (not more than 0.1 kg/cm$^2$, for example) owing to the vacuumization caused by the negative pressure source (initial state).

When the signal for cooling-down is injected into the control device 14, namely when the switch for the air conditioner is turned on while the thermal load is in an increased state (to be judged based on the temperature of the ambient air and the internal temperature of the coach, for example), the vacuum supply valve 10 is opened by the signal from the control device 14 and the negative pressure in the vacuum tank 11 is supplied to the water storage tank 6 and the evaporation chamber 5. As a result, the water in the water storage tank 6 is aspirated by the negative pressure, decompressed en route by the orifice 8, caused to flow in the evaporation chamber 5, and vaporized owing to exchange of heat with the gaseous coolant. The steam resulting from the vaporization is further aspirated by the negative pressure and consequently accumulated inside the vacuum tank 11.

Figure 4:
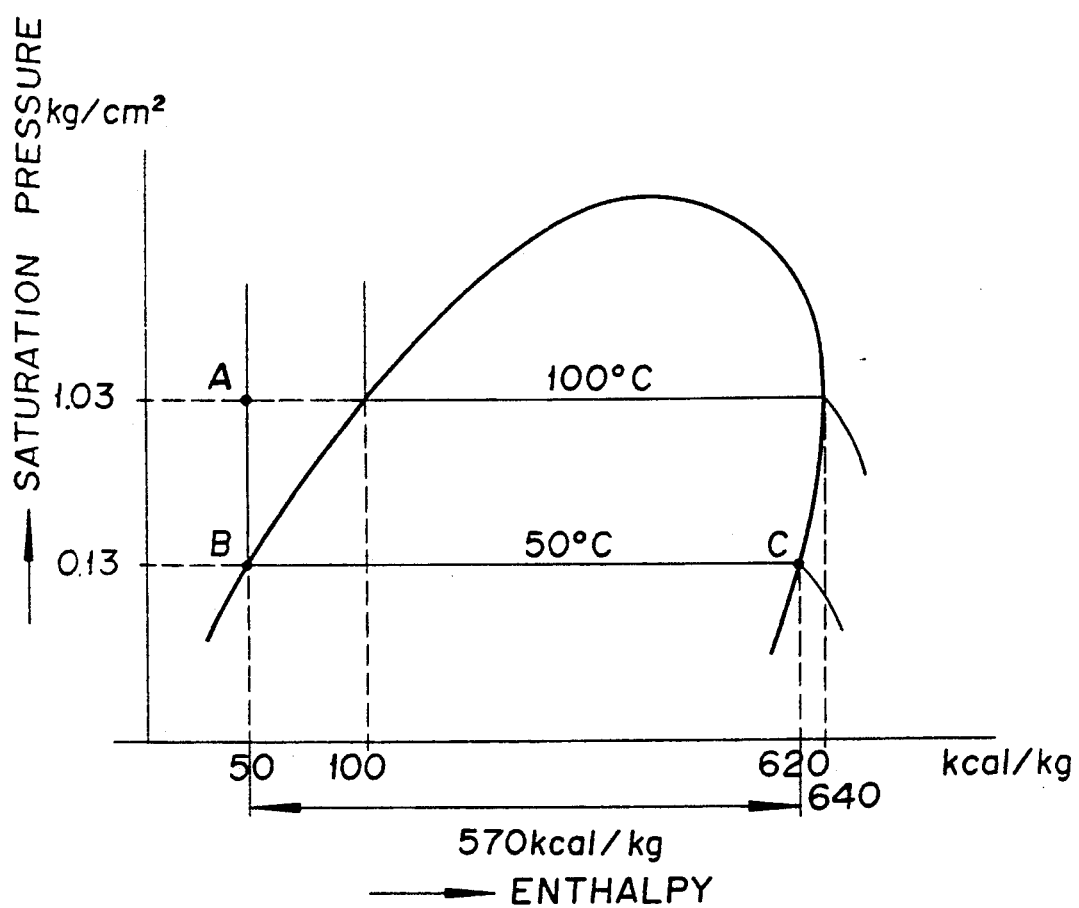
FIG. 4 is a pressure-enthalpy graph of saturated steam, to be used in the explanation of the operating principle of the forced cooling system shown in FIG. 1.

This process of operation will be described in detail below with reference to FIG. 4 representing a pressure-enthalpy graph of saturated steam. The points, A to C, shown in the graph correspond respectively to the points, A to C, shown in FIG. 1. To be more specific, the points A and B respectively denote the upstream side and the downstream side of the orifice 8 and the point C denotes the outlet side of the evaporation chamber 5.

As illustrated in FIG. 4, when the temperature of the water is about 50° C., the water is allowed to vaporize by lowering the atmospheric pressure (about 1.03 kg/cm$^2$) at the point A to the pressure of about 0.13 kg/cm$^2$ at the point B by means of the orifice 8. Since the gaseous coolant (Freon 12) of high temperature and high pressure which flows into the condenser 1 has the temperature of about 80° C. (the pressure of about 15 kg/cm$^2$), the water at 50° C. readily begins to vaporize through exchange of heat with the gaseous coolant when this water is decompressed to about 0.13 kg/cm$^2$. Moreover, since the heat of vaporization of the water at 50° C. (the difference of enthalpy between the point B and the point C) has a fairly large magnitude of about 570 Kcal/kg (larger than the heat of vaporization of water at 100° C. under the atmospheric pressure), this water is capable of quickly depriving the gaseous coolant of a large volume of heat. As a result, the gaseous coolant is quickly cooled to about 60° C. and consequently liquefied quickly into a liquid coolant.

The water at the point A, while passing through the orifice 8, is decompressed as described above and consequently made to assume the state of a gas-liquid mixture (atomized particles) highly susceptible of vaporization at the point B. This atomized water susceptible of vaporization flows into the evaporation chamber 5. The evaporation chamber 5 is a limited empty space and is formed in the coolant inlet side flow path 3 of the condenser 1, namely the portion at which the gaseous coolant has the highest temperature, the exchange of heat between the water and the gaseous coolant is concentrically carried out at the site of the highest efficiency. Thus, the efficiency of heat exchange between the water and the gaseous coolant in the condenser 1 is notably improved.

The steam resulting from the vaporization of water in the evaporation chamber 5 is aspirated by the negative pressure supplied from the vacuum tank 11 and is consequently collected within the vacuum tank 11. In the course of this process, the steam again assumes a liquid state by releasing the accompanying heat into the ambient air.

When the introduction of the signal for cooling-down to the control device 14 ceases to exist after the completion of cooling-down, the vacuum supply valve 10 is demagnetized and returned by the resilient force to the closed position and the drain valve 13 is excited and opened by the signal from the control device 14. When the drain valve 13 is opened, the water collecting in the vacuum tank 11 is discharged by its own weight through the drainpipe 12 into the water storage tank 6.

After the elapse of a time sufficient for the discharge of the drain, the drain valve 13 is demagnetized and closed by the resilient force. Now that the vacuum supply valve 10 and the drain valve 13 have both assumed their closed states, the vacuum tank 11 is vacuumized by the negative pressure source and consequently reset to its initial state storing a stated amount of negative pressure.

Figure 5:
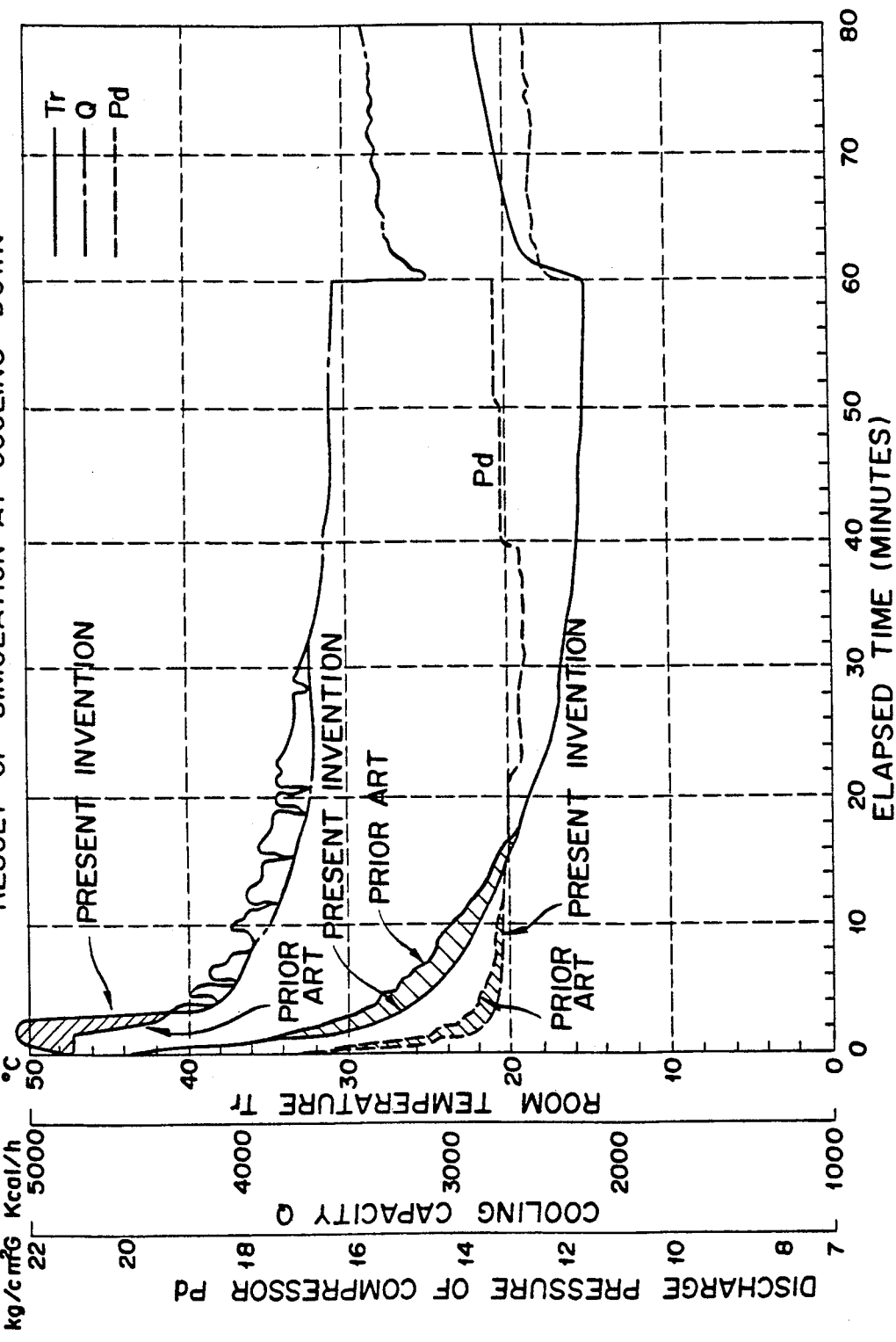
FIG. 5 is a diagram illustrating the results of simulation of cooling-down performed in the presence of the forced cooling system illustrated in FIG. 1 and in the absence thereof.

FIG. 5 is a diagram showing the results of simulation of cooling-down, comparing the operation of the forced cooling system of this invention performed in the presence of the condenser 1(this invention) and the absence thereof (conventional) with respect to the items of internal temperature of the coach (room temperature, Tr), cooling ability (Q), and compressor discharge pressure (Pd).

As shown in FIG. 5, when the forced cooling system utilizing the latent heat resulting from the vaporization of water is incorporated in the condenser 1 and it is operated in conjunction with the conventional air-cooling system during the course of cooling-down (during the manifestation of the maximum ability of the air conditioner), the discharge pressure (Pd) of the compressor is lower than is attained by the conventional compressor because the gaseous coolant of high temperature which flows into the condenser 1 through the coolant inlet tube 2 is converted more quickly into the liquid coolant and the total volume of the coolant as a whole is proportionately smaller than in the conventional air conditioner. As a result, the cooling ability (Q) of the air conditioner is notably improved as compared with that of the conventional air conditioner because the volume of the coolant circulated inside the refrigeration circle per unit time during the manifestation of the maximum M ability of the compressor is increased and the amount of heat absorbed per unit time in the evaporator is proportionately increased. Thus, the room temperature (Tr) is more quickly lowered than is attained by the conventional air conditioner.

In accordance with the present embodiment, simply by installing the evaporation chamber 5 in the coolant inlet side flow path 3 of the condenser 1 and causing the evaporation chamber 5 to introduce the water therein by aspiration thereby allowing the gaseous coolant to release the latent heat of vaporization concentrically and efficiently in a large volume into the water, the efficiency of exchange of heat between the water and the gaseous coolant can be notably improved and the operating ability of the condenser 1 can be amplified to a great extent with a device of simple construction without entailing a dimensional addition to the equipment. As a result, the maximum cooling ability of an automobile air conditioner is notably improved and the realization of the rapid cooling-down is made possible. Thus, the liberation from the noise which is attendant on the full-speed operation of the fan during the cooling-down period is attained early. Moreover, since the incorporation of the forced cooling system in the condenser 1 suffices to improve the ability of the air conditioner, the otherwise inevitable dimensional addition to the component devices of the air conditioner can be avoided and the space occupied by the air conditioner, the weight of the automobile body, and the amount of the coolant to be used can be decreased.

In accordance with the present embodiment, the problem of corrosion of the condenser 1 with water is precluded because the vaporization of water is enabled to occur inside the evaporation chamber 5. Further, the efficient use of water can be attained and, at the same time, the time and labor for the maintenance of water can be economized because the water for vaporization is repeatedly used by circulation through the closed path.

Moreover, in accordance with the present embodiment, the vaporization of water in the evaporation chamber 5 is attained easily and the collection of the latent heat of vaporization is effected copiously because the orifice 8 is formed on the evaporation chamber 5 inlet side of the inlet tube 7 and utilized for decompressing the water being introduced by aspiration into the evaporation chamber 5. Besides, the forced cooling system can be made to operate exclusively during the cooling-down period because the vacuum supply valve 10 is installed in the outlet tube 9 and operated to effect the introduction of water by aspiration into the evaporation chamber 5 only when necessity arises.

Of course, this invention need not be limited to the embodiment described above but may be altered or modified in various respects without departing from the scope of this invention.

For example, the present embodiment has been described as utilizing negative pressure as the source for aspiration of water into the evaporation chamber 5. The use of the negative pressure is not critical. A water pump may be adopted as means of circulation and operated for the circulation of water. In this case, the necessity for using the control valve 10 may be obviated by additionally imparting to this water pump the function of opening and closing a flow path.

The foregoing embodiment has been represented as a case of having the forced cooling system of this invention incorporated in the condenser 1 of the serpentine type. This invention need not be limited to this case but may be modified to allow the incorporation of the forced cooling system in a condenser of the multi-flow type instead. Now, in the case of having the forced cooling system incorporated in a condenser of the multi-flow type, a number of concrete examples of the construction of the coolant inlet side flow path of the condenser and cooling means disposed therein will be described in the following.

Figure 6:
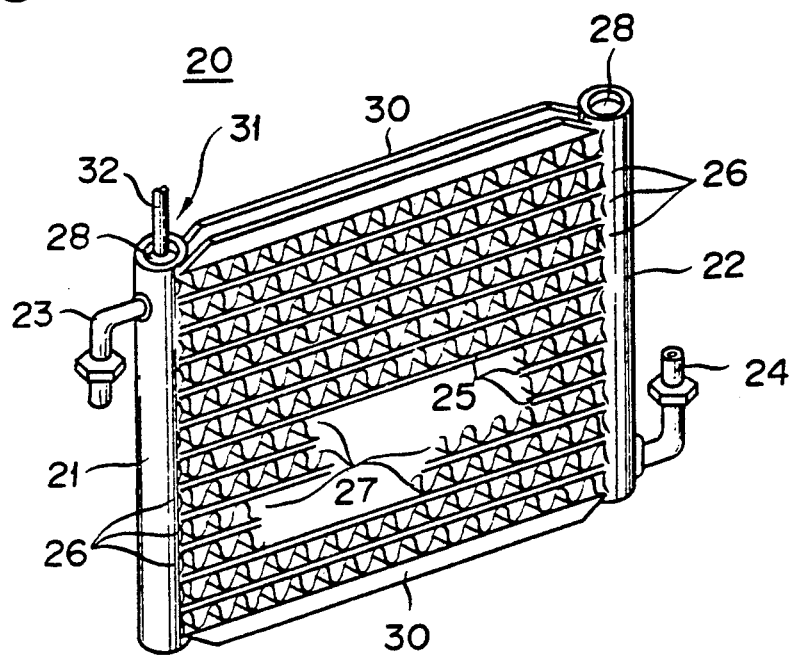
FIG. 6 is a perspective view of a condenser of the multi-flow type, as another embodiment of this invention.
Figure 7:
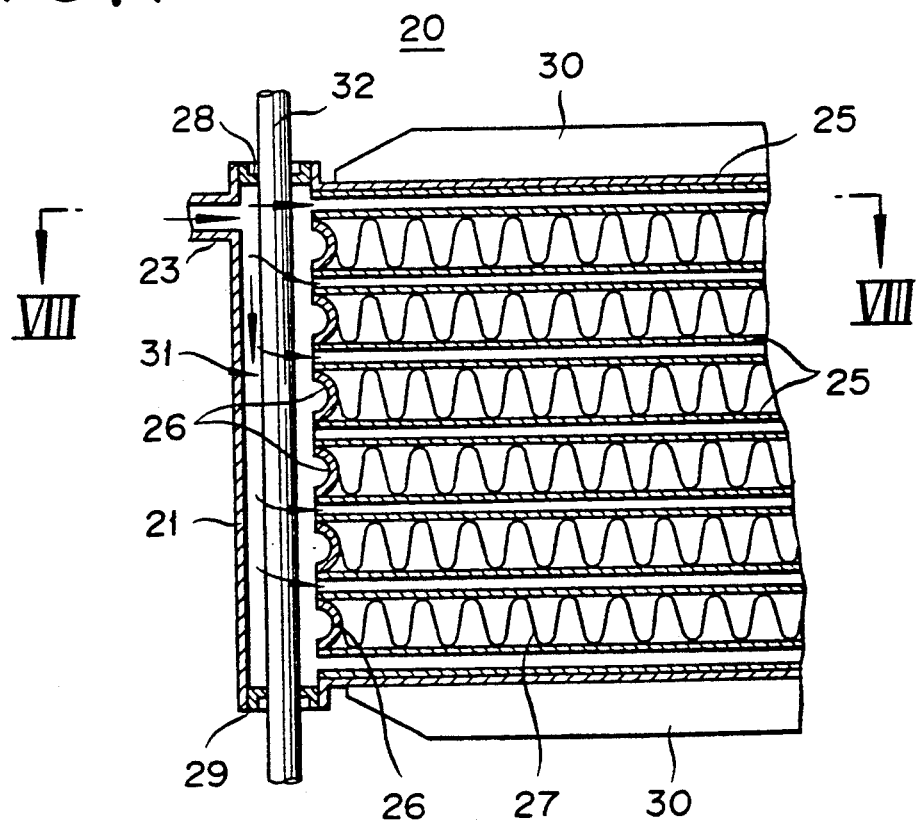
FIG. 7 is a cross section illustrating the essential part of the condenser of FIG. 6.

A condenser 20 of the multi-flow type illustrated in FIG. 6 and FIG. 7, for example, is formed by parallelly disposing as separated by a prescribed distance an inlet side header tank 21 provided with a coolant inlet tube 23 for allowing inflow of the gaseous coolant of high temperature and high pressure and an outlet side header tank 22 provided with a coolant outlet tub 24 for allowing outflow of the coolant mentioned above and having a multiplicity of flat tubes 25 interposed between the two header tanks for their intercommunication, so that the gaseous coolant entering the inlet side header tank 21 advances in a plurality of parallel currents and flows into the outlet side header tank 22. On the opposed side surfaces of the two header tanks 21, 22, domally swelled parts 26 are formed so as to improve the pressureresisting strength of the condenser 20. Reference numeral 27 stands for a heat-transfer corrugated fin, 28 and 29 each for a blind lid, and 30 for a reinforcing plate. A cooling pipe 32 forming cooling means for an evaporation part 31 corresponding to said evaporation chamber 5 and which vaporizes water owing to exchange of heat with the gaseous coolant is disposed in the header tank 21 serving as a coolant inlet side flow path for the condenser 20 as laid along the longitudinal direction of the tank 21. The gaseous coolant of high temperature and high pressure flowing in through the coolant inlet tube 23 is passed around the periphery of the cooling pipe 32 and allowed to exchange heat with the water inside the cooling pipe 32.

For the purpose of improving the efficiency of exchange of heat, fins 33 may be fitted around the periphery of a cooling pipe 32 as illustrated in FIG. 8. In the construction illustrated in FIG. 8 (A), the fins 33 cannot be disposed on the entire periphery of the cooling pipe 32 because the terminal parts of the flat tubes 25 possess a linear shape and are driven into the header tank 21. When the terminal parts of the flat tubes 25 are rounded along the inner surface of the header tank 21 as illustrated in FIG. 8 (B), the fins 33 can be disposed on the entire periphery of the cooling pipe 32.

As illustrated in FIG. 9 and FIG. 10, the cooling pipe 32 may be disposed outside the inlet side header tank 21a as held in contact therewith instead of being disposed inside the inlet side header tank 21. In this case, the inlet side header tank 21a is desired to be provided with a depressed part 34 for accommodating the cooling pipe 32 therein for the purpose of enlarging the surface of contact of this header tank with the pipe 32.

Figure 11:
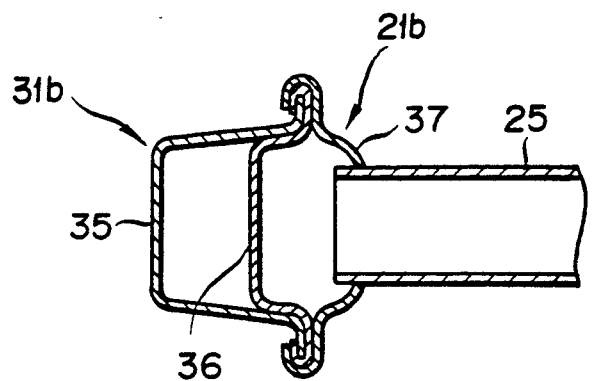
FIG. 11 is a cross section illustrating the essential part of a condenser as still another embodiment of this invention.
Figure 12:
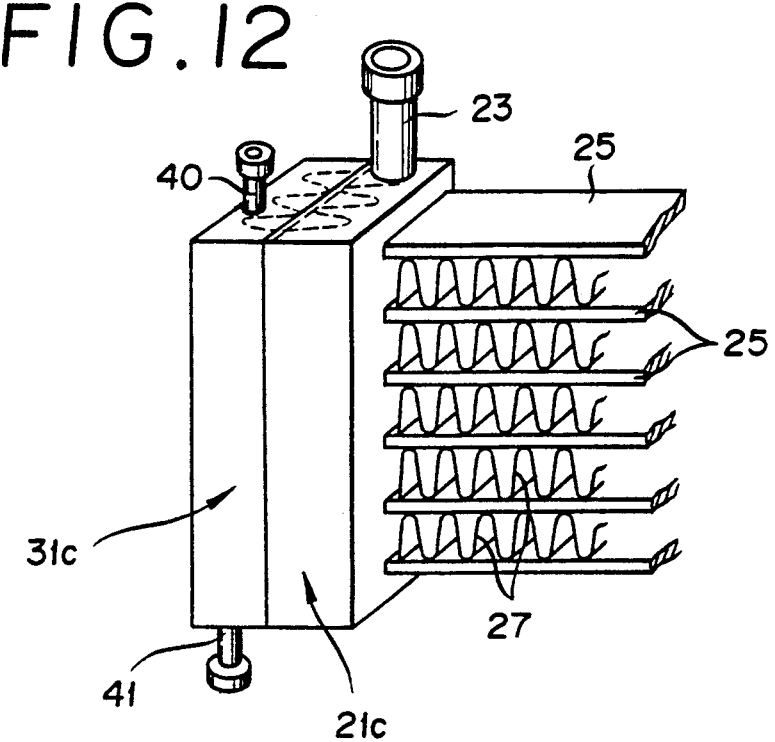
FIG. 12 is a cross section illustrating the essential part of a condenser as a further embodiment of this invention.

An evaporation part 31b as cooling means need not be in the form of a pipe but may be composed of two partition plates 35, 36 as illustrated in FIG. 11. In the case of this embodiment, the inlet side header tank 21b is not in the form of a pipe but is formed of two partition plates 36, 37. This partition plate 36 serves as a partition between the inlet side header tank 21b and the evaporation part 31b. In other words, by staking and soldering the edge parts of three partition plates, the evaporation part 31b and the inlet header tank 21b can be simultaneously formed.

Figure 13:
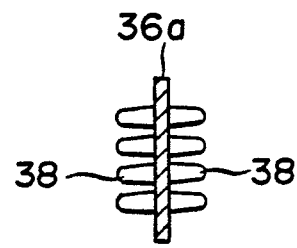
FIGS. 13-15 are cross sections illustrating the essential parts of the condenser shown in FIG. 12, for the purpose of depicting a process of manufacture and its structure.
Figure 14:
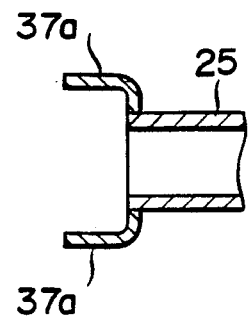
Figure 15:
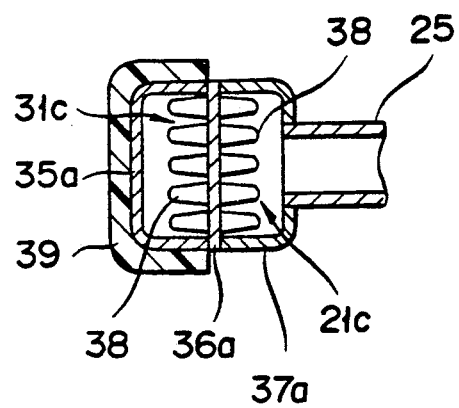

FIG. 12 and FIGS. 13-15 illustrate a modification of the embodiment shown in FIG. 11. In this modified embodiment, fins 38 as a heat-radiating member are first soldered one each to the opposite sides to a partition plate 36a as illustrated in FIG. 13 and a partition plate 37a is then soldered to the terminal part of the flat tube 25 as illustrated in FIG. 14. Subsequently, the evaporation part 31c and the inlet side header tank 21c are formed by soldering the partition plate 36a to the partition plate 37a and soldering the partition plate 35a to the partition plate 36 as illustrated in FIG. 15 (C). It is permissible to attach a heat insulator 39 to the periphery of the evaporation part 31c and allow the water in the evaporation part 31c to exchange heat only with the portion of the coolant existent in the inlet side header tank 21c and consequently improve the efficiency of exchange of heat. The reference numerals 40, 41 shown in FIG. 12 respectively denote an inlet tube and an outlet tube for water.

The forced cooling system of this invention may have the evaporation chamber or a part thereof disposed in the outlet side profile tube or in the outlet side header-tank in addition to being disposed in the coolant inlet side profile tube or in the inlet side header tank, for example, where the gaseous coolant has a high temperature.

What is claimed is:

1. A coolant condensing apparatus, comprising a condenser for air-cooling a gaseous coolant of high temperature and high pressure for conversion thereof into a liquid coolant,
   cooling means disposed in a part of said condenser and adapted to effect cooling of said gaseous coolant by exchange of heat with an atomized or gas-liquid mixed liquid,
   decompression means disposed in the upstream of the liquid flow path of said cooling means and adapted to atomize a liquid into the state of a gas-liquid mixture, and
   circulation means for circulating said liquid in a closed loop passed through said decompression means and said cooling means.

2. A coolant condensing apparatus according to claim 1, wherein said cooling means incorporates therein a heat-radiating member.

3. A coolant condensing apparatus according to claim 2, wherein said heat-radiating member is disposed at least either inside or outside of the flow path for said liquid.

4. A coolant condensing apparatus according to claim 1, wherein said circulation means is provided with a negative pressure device.

5. A coolant condensing apparatus according to claim 4, which further comprises open-close means for opening and closing the flow path of said liquid.

6. A coolant condensing apparatus according to claim 5, which further comprises control means for opening the flow path of said liquid only when necessity arises.

7. A coolant condensing apparatus according to claim 1, wherein said circulation means is provided with a pump.

8. A coolant condensing apparatus according to claim 7, which further comprises control means for opening the flow path of said liquid only when necessity arises.

9. A coolant condensing apparatus according to claim 1, wherein said decompression means is an orifice.

10. A coolant condensing apparatus according to claim 1, wherein said liquid is water.

11. A coolant condensing apparatus according to claim 1, wherein said condenser ..is a multi-flow type condenser which is formed by opposing two header tanks to each other and interposing a plurality of flat tubes therebetween in such a manner as to allow said header tanks to intercommunicate with each other.

12. A coolant condensing apparatus according to claim 11, wherein said cooling means and either header tank of said multi-flow type condenser are simultaneously formed of three partition plates, the middle partition plate of which serves as a partition between said cooling means and said header tank of the multi-flow type condenser.

13. A coolant condensing apparatus according to claim 1, wherein said condenser is a serpentine type condenser which is formed by bending serpentinely a profile tube having a plurality of flow paths formed therein.

* * * * *

UNITED STATES PATENT AND TRADEMARK OFFICE
CERTIFICATE OF CORRECTION

PATENT NO. : 5,186,242

DATED : Feb. 16, 1993

INVENTOR(S) : Tsunenari Adachi, Hitoshi Akasaka, Yutaka Moriyama

It is certified that error appears in the above-identified patent and that said Letters Patent is hereby corrected as shown below:

```
Title Page,    Item    [56] References Cited  U.S. PATENT
   DOCUMENTS, last listing; "Hidaba" should read --Hidaka -- .
Column 7, line 37; "maximum M ability" should read
   -- maximum ability --.
Column 8, line 52; "tub"  should read -- tube --.
Column 8, line 60/61; "pressureresist-ing" should read
   -- pressure-resisting --.
Column 10, line 46; "condenser .. is" should read
   -- condenser is --.
```

Signed and Sealed this

Eighteenth Day of January, 1994

*Attest:*

BRUCE LEHMAN

*Attesting Officer*   Commissioner of Patents and Trademarks